(12) United States Patent
Weng et al.

(10) Patent No.: US 8,296,144 B2
(45) Date of Patent: Oct. 23, 2012

(54) SYSTEM AND METHOD FOR AUTOMATED TESTING OF COMPLICATED DIALOG SYSTEMS

(75) Inventors: Fuliang Weng, Mountain View, CA (US); Hua Ai, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 1007 days.

(21) Appl. No.: 12/133,123

(22) Filed: Jun. 4, 2008

(65) Prior Publication Data

US 2009/0306995 A1    Dec. 10, 2009

(51) Int. Cl.
*G10L 11/00* (2006.01)
(52) U.S. Cl. ........ 704/270; 704/246; 704/247; 704/251; 704/252
(58) Field of Classification Search .................... None
See application file for complete search history.

(56) References Cited

U.S. PATENT DOCUMENTS

| | | | |
|---|---|---|---|
| 6,631,346 B1 * | 10/2003 | Karaorman et al. | 704/9 |
| 7,228,278 B2 * | 6/2007 | Nguyen et al. | 704/257 |
| 7,398,211 B2 * | 7/2008 | Wang | 704/257 |
| 7,853,453 B2 * | 12/2010 | Potter | 704/270.1 |
| 2004/0249638 A1 * | 12/2004 | Wang | 704/246 |
| 2006/0111909 A1 * | 5/2006 | Maes et al. | 704/270 |
| 2006/0200350 A1 * | 9/2006 | Attwater et al. | 704/251 |
| 2006/0293886 A1 * | 12/2006 | Odell et al. | 704/231 |
| 2007/0005369 A1 * | 1/2007 | Potter | 704/275 |
| 2008/0201135 A1 * | 8/2008 | Yano | 704/201 |
| 2008/0215320 A1 * | 9/2008 | Wu et al. | 704/231 |
| 2009/0112586 A1 * | 4/2009 | Williams | 704/239 |

* cited by examiner

*Primary Examiner* — Leonard Saint Cyr
(74) *Attorney, Agent, or Firm* — Dergosits & Noah LLP; Geoffrey T. Staniford

(57) ABSTRACT

Embodiments of an automated dialog system testing method and component are described. This automated testing method and system supplements real human-based testing with simulated user input and incorporates a set of evaluation measures that focus on three basic aspects of task-oriented dialog systems, namely, understanding ability, efficiency, and the appropriateness of system actions. These measures are first applied on a corpus generated between a dialog system and a group of human users to demonstrate the validity of these measures with the human users' satisfaction levels. Results generally show that these measures are significantly correlated with these satisfaction levels. A regression model is then built to predict the user satisfaction scores using these evaluation measures. The regression model is applied on a simulated dialog corpus trained from the above real user corpus, and show that the user satisfaction score estimated from the simulated dialogs do not significantly differ from the real users' satisfaction scores. These evaluation measures can then be used to assess the system performance based on the estimated user satisfaction.

10 Claims, 4 Drawing Sheets

300

| Utterances | Constraints Understood by the System | Action Types & Understanding Status |
|---|---|---|
| User1: I'm looking for a five star thai [italian] restaurant accept reservations | | Action: req_info<br>Slots conveyed: 3 slots |
| System1: There are 7 restaurants that have a five star rating, accept reservations, and serve thai food in my database. Here are the first few: Tejus, Slam Corner Cate, Setha's Restaurant. Should I continue? | service level=five star<br>cuisine type=thai<br>payment type=credit card | Action: pro_info<br>Slots accepted: 3 slots<br>Completely matched: 2 slots |
| User2: I need to look for italian restaurant | | Action: rereq_info<br>Slot conveyed: 1 slot |
| System2: Are you looking for a restaurant that serves italian food? | service level=five star<br>cuisine type=Italian(unconfirmed)<br>payment type=credit card | Action: exp_confirm<br>Slot updated: 1 slot<br>Completely matched: 2.5 slot |
| User3: yes | | Action: exp_confirm<br>Slot conveyed: 1 slot |
| System3: I found 38 restaurants that serve italian food, accept reservations and have a five star rating, for example, Toto Café piaaera... | service level=five star<br>cuisine type=Italian(confirmed)<br>payment type=credit card | Action: pro_info<br>Slots accepted: 3 slots<br>Completely matched: 3 slots |
| User4: I'm done. | | Action: close_dialog |

Sample Dialog with Annotations.

FIG. 3

SYSTEM AND METHOD FOR AUTOMATED TESTING OF COMPLICATED DIALOG SYSTEMS

FIELD

Embodiments of the invention relate generally to dialog systems, and more specifically to automated testing of complicated dialog systems.

BACKGROUND

A dialog system is a computer system that is designed to converse with a human using a coherent structure and text, speech, graphics, or other modes of communication on both the input and output channel. Dialog systems that employ speech are referred to as spoken dialog systems and generally represent the most natural type of machine-man interface. With the ever-greater reliance on electronic devices, spoken dialog systems are increasingly being implemented in many aspects used of daily life. The increasing demands of such systems require shorter system development cycles and better automatic system development techniques. As a result, machine learning techniques are applied to learn dialog strategies automatically, such as reinforcement learning, supervised learning and so on. These techniques require a significant amount for training data for the automatic learners to sufficiently explore the vast space of possible dialog states and strategies. However, it is often difficult to obtain training corpora that are large enough to ensure that the learned strategies are reliable. One approach to solving this problem is to generate synthetic training corpora using computer simulated users. The simulated users are built to explore unseen but still possible user behaviors. These simulated users can interact with the dialog systems to generate large amounts of training data in a low-cost and time-efficient manner. Previous studies have shown that the dialog strategies learned from the simulated training data often outperform hand-crafted strategies. There are also studies that use user simulation to train speech recognition and understanding components.

While user simulation is generally useful in dialog system training, it has not been extensively used in the system training phase, except in very simple cases, such as testing speech recognition components. However, realistic user behaviors are critical in the testing phase because the systems are evaluated and adjusted based on the analysis of the dialogs generated in this phase. Therefore, it is important that the simulated user input to test the system be as close as possible to actual human input.

In general, present simulated users have rather limited ability to mimic actual human users' behaviors and typically over-generate possible dialog behaviors. While this is not a major problem in training systems, it is a significant disadvantage in testing systems, where improper test results may be due to the over-generated dialog behavior for the inputs, rather than improper operation of the dialog system. Furthermore, present simulated users cannot provide subjective user satisfaction feedback, which is also important to improve tested dialog systems.

What is needed, therefore, is a simulated user component that replaces at least some of the human subjects in the test phase of dialog system development to accelerate system development while still obtaining useful feedback from the system evaluation.

What is further needed is a set of comprehensive evaluation measures that can be used to automatically assess the dialog system.

BRIEF DESCRIPTION OF THE DRAWINGS

Embodiments of the present invention are illustrated by way of example and not limitation in the figures of the accompanying drawings, in which like references indicate similar elements and in which:

FIG. 3 is a table that illustrates the computation of the understanding ability measure through an example dialog, under an embodiment.

DETAILED DESCRIPTION

Figure 1:
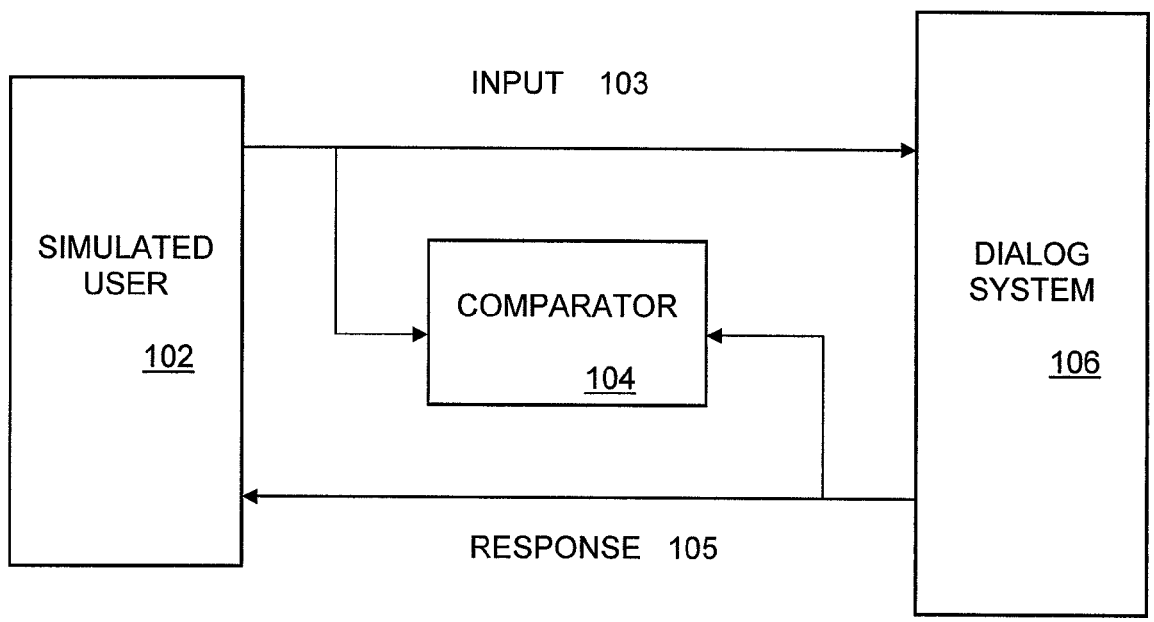
FIG. 1 is a block diagram of an automatic testing system for spoken dialog systems, under an embodiment.

Embodiments of an automated dialog system testing method and component are described. This automated testing method and system supplements real human-based testing with simulated user input and incorporates a set of evaluation measures that focus on three basic aspects of task-oriented dialog systems, namely, understanding ability, efficiency, and the appropriateness of system actions. These measures are first applied on a corpus generated between a dialog system and a group of human users to demonstrate the validity of these measures with the human users' satisfaction levels. Results generally show that these measures are significantly correlated with these satisfaction levels. A regression model is then built to predict the user satisfaction scores using these evaluation measures. The regression model is applied on a simulated dialog corpus trained from the above real user corpus, and show that the user satisfaction score estimated from the simulated dialogs do not significantly differ from the real users' satisfaction scores. These evaluation measures can then be used to assess the system performance based on the estimated user satisfaction.

In the following description, numerous specific details are introduced to provide a thorough understanding of, and enabling description for, embodiments of the automatic testing system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

To reduce dialog system development time, automatic test systems are employed to implement machine learning techniques to apply dialog strategies automatically. Dialog systems generally require large amounts of training data for the automatic learners to sufficiently explore the vast space of possible dialog states and strategies. Training systems may employ user simulation to generate synthetic training corpora using computer simulated users. The simulated users are modeled to mimic real users' behaviors and to produce unseen, but still possible user behaviors. Such simulated users can interact with dialog systems to generate large amounts of training data in a low-cost and time-efficient manner. The use of simulation for training generally does not require particularly realistic user behavior because any over-generated simulation behavior simply provides the machine learners with a broader dialog space to explore. In the dialog system testing context, however, such lax simulation can be problematic. This is because the testing process generally requires very realistic user behaviors since the dialog system is evaluated and adjusted based on the analysis of the dialogs generated in the test process. The goal of testing is to help develop a dialog system that produces dialog corresponding to actual human dialog, so test signals must be carefully chosen to prevent any anomalies, such as over-generated dialog behavior, which might be blamed for untargeted functions.

In one embodiment, the spoken dialog testing system provides user simulation by incorporating a set of evaluation measures for automatically assessing the dialog system performance. These evaluation measures focus on the three basic aspects of task-oriented dialog systems of understanding ability, efficiency, and the appropriateness of the system actions. The evaluation measures are first applied on a corpus generated between a dialog system and a group of human users to demonstrate the validity of these measures with the human users' satisfaction scores. A regression model is then built to predict the user satisfaction scores using these evaluation measures. The regression model is also applied on a simulated dialog corpus trained from the real user corpus. In general, it is shown that the user satisfaction scores estimated from the simulated dialogs do not differ significantly from the real users' satisfaction scores. Thus, these evaluation measures can be used to assess the system performance based on the estimated user satisfaction.

FIG. 1 is a block diagram of an automatic testing system for spoken dialog systems, under an embodiment. For purposes of the present description, any of the processes executed on a processing device may also be referred to as modules or components, and may be standalone programs executed locally on a respective device computer, or they can be portions of a distributed client application run on one or more devices. As shown in FIG. 1, a dialog system 106 receives spoken input 103 from one or more simulated users 102. The input can be any form of verbal communication that generates acoustic signals recognizable by the dialog system 106, and that corresponds to realistic human input. The dialog system generates a response 105 that can be fed back to the simulated users and/or analyzed for evaluation purposes. During optimum operation, the response 105 from the dialog system 106 should correspond exactly to the input 103 generated by the simulated user 102. A comparator process 104 compares the response 105 with the input 103 to determine the amount of correspondence between the input 103 and response 105 signals. The comparator process 104 performs or includes an analysis function that evaluates the dialog system response 105 in comparison with the simulated user input 103.

In one embodiment, the automatic testing system incorporates a set of evaluation measures for automatically assessing the dialog system 106 performance. The evaluation measures focus on three basic aspects of task-oriented dialog systems and include understanding ability, efficiency, and the appropriateness of system actions. The understanding ability aspect measures the ability of the dialog system to understand the input. The efficiency aspect measures the speed of the system in terms of time to produce a response to the input, as well as the number of steps to perform a task. In certain cases there may be a misunderstanding between the dialog system and the user, which may be due to several factors, such as noise, lack of knowledge of the system and/or the user. In this case there is no understanding of the input. The appropriateness of system actions measure determines what an appropriate response would be when the system understands, partially understands, or does not understand user's input.

In one embodiment, the comparator 104 receives input 103 directly from the simulated user 102 and it also receives response output 105 directly from the dialog system 106. For each generated input 103 there is an expected or optimum response. The comparator obtains the expected output from the simulated user 102 given the input 103. During a test procedure, the comparator 104 compares the actual response 105 to the expected output to determine the correctness of the response 105 from the dialog system 106 for the given input 103. If there is a sufficiently high degree of correctness, the dialog system is deemed to have performed satisfactorily with respect to the given input. If, however, there the actual response does not correspond sufficiently to the expected response, then the dialog system has failed with respect to the given input. In this case, the system uses the evaluation measures to indicate the necessary corrections to the system.

There may be several different levels of comparison performed by the comparator process 104. One level of comparison can be at the acoustic level in which the acoustic waveforms of the actual response and expected response are compared. A second level is the sentence or utterance level, in which only a textual form is given and no acoustic information is analyzed. The third level of comparison is the semantic representation level, which include speech actions, semantic slots (or arguments) and structures.

Figure 2:
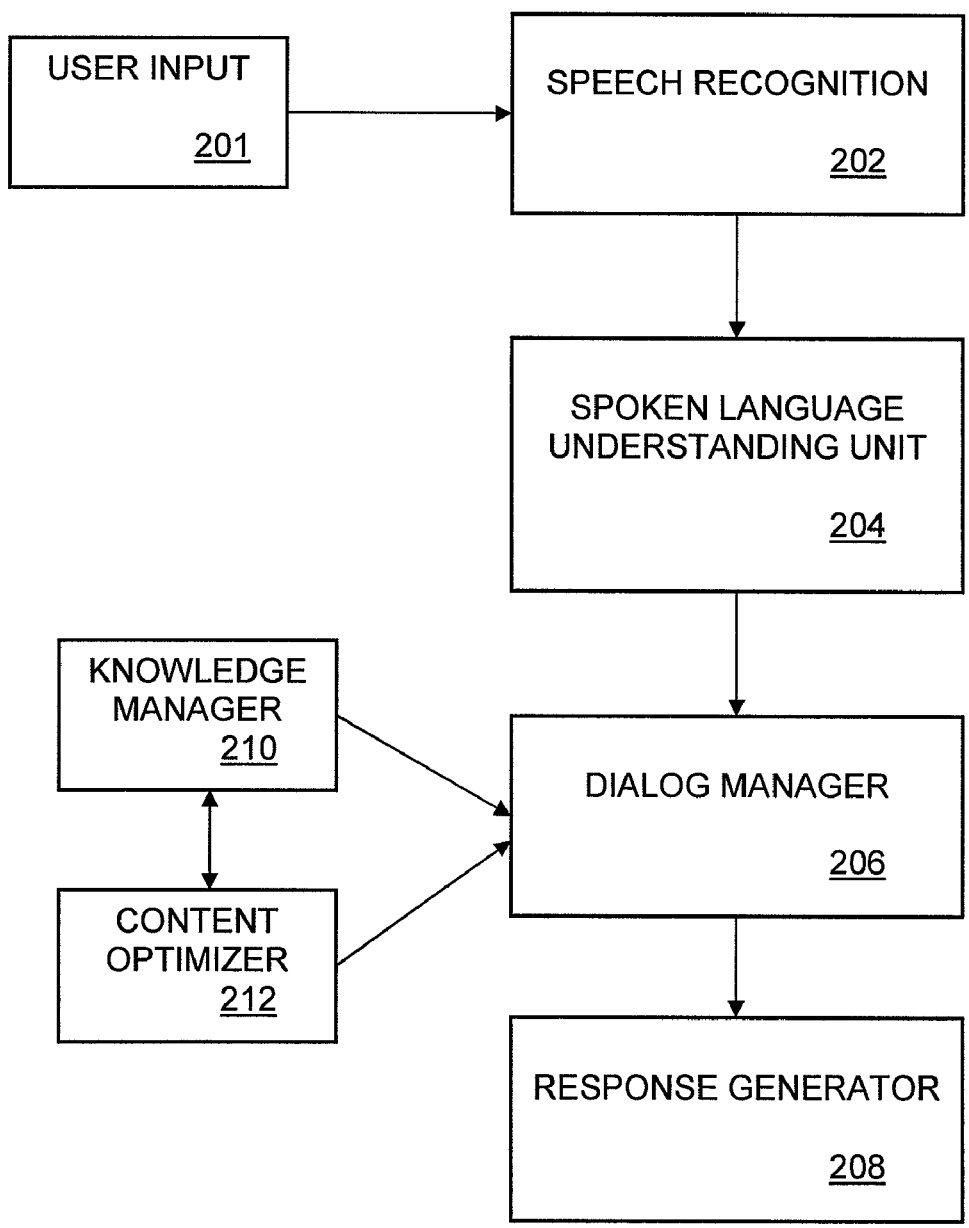
FIG. 2 is a block diagram of a spoken dialog system that incorporates a simulated user test system, according to an embodiment.

The automated dialog system testing process can be incorporated into the development of a spoken dialog system that supports various functions and applications to allow users to interact with devices and receive services while performing other cognitively demanding, or primary tasks, such as driving or operating machinery. Such a dialog system can use commercially available or proprietary components for language applications. FIG. 2 is a block diagram of a spoken dialog system that incorporates a simulated user test system, according to an embodiment. The core components of system 200 include a spoken language understanding (SLU) module 204 with multiple understanding strategies for imperfect input, an information-state-update dialog manager (DM) 206 that handles multiple dialog threads and mixed initiatives, a knowledge manager (KM) 210 that controls access to ontology-based domain knowledge, and a content optimizer 212 that connects the dialog manager and the knowledge manager for resolving ambiguities from the users' requests, regulating the amount of information to be presented to the user, as well as providing recommendations to users. A response generator 208 provides the output of the system 200, such as response 105 in FIG. 1.

In one embodiment, spoken user input 201 produces acoustic waves that are received by a speech recognizer unit 202. The speech recognizer stage 202 can include components to provide functions, such as dynamic grammars and class-based n-grams. In the case where the user input 201 is text-based rather than voice-based, the speech recognition stage 202 is bypassed, and simulated user input is provided directly to the spoken language unit 204.

The comparator 104 can be configured to compare the input and output response on any of the three levels, depending upon system development constraints and requirements. In general, comparison at the acoustic level involves analysis of actual acoustic signal waveforms as they are input to the speech recognizer 202, comparison at the utterance (or sentence) level involves analysis of the input at the spoken language unit 204, and comparison at the semantic level involves analysis at the input at the dialog manager 206.

In one embodiment, the dialog system training process performs a comparison of simulated user input and response at the semantic level. For this embodiment, system 100 of FIG. 1 uses a sequence of semantic frames as the basis for comparison. In general, a frame is a named set of structured slots, where the slots represent related pieces of information, and is a domain dependant selection. A frame may be used to describe semantic meanings such as speech acts, actions, and/or semantic constraints from the user. It may also be used by the system as an internal representation to communicate among different system modules, such as SLU 204, DM 206, and KM (210). In certain cases, each slot has an associated context-free grammar that specifies word string patterns that match the slot. In general, a slot structure consists of a slot name (slot_name) and corresponding value or another frame as its value (slot_value). For example, consider a user input that is a request (utterance) for the system to locate a restaurant, "I would like lunch in Palo Alto" that may be part of a navigation system. This request has a number of constraints that, such as time, action, and location. The slot structure for this utterance may be as follows:

Location: Palo Alto
Time: Lunch
Action: Find Restaurant
SpeechAct: Request/Command Most user simulation models are trained from dialog corpora generated by human users. Earlier models predict user actions based on simple relations between the system actions and the following user responses. Some systems suggest a bi-gram model to predict the next user's action based on the previous system's action, or add constraints to the bi-gram model to accept the expected dialog acts only. However, the basic assumption of making the next user's action dependent only on the system's previous action is oversimplified. Other studies model more comprehensive user behaviors by adding user goals to constrain the user actions. These simulated users mimic real user behaviors in a statistical way, conditioning the user actions on the user goals and the dialog contexts. More recent research defines agenda for simulated users to complete a set of settled goals. This type of simulated user updates the agenda and the current goal based on the changes of the dialog states.

In one embodiment, the automatic training system builds a simulated user 102 in which the simulated user keeps a list of its goals and another agenda of actions to complete the goals. For the restaurant selection domain example described above, the users' tasks are to find a desired restaurant based on several constraints specified by the task scenarios. The restaurant constraints are the goals for the simulated user. For this example, at the beginning of the dialog, the simulated user randomly generates an agenda with three ordered goals corresponding to the three constraints in requesting a restaurant. During the dialog, the simulated user updates its list of goals by removing the constraints that have been understood by the system. It also removes from its agenda the unnecessary actions that are related to the already filled goals while adding new actions. New actions are added according to the last system's question (such as requesting the user to repeat the last utterance) as well as the simulated user's current goals. The actions that address the last system's question are given higher priorities then other actions in the agenda. The simulated user then randomly generates an agenda of the updated actions together with their priorities.

In one embodiment, the simulated user 102 interacts with the dialog system 106 on the word level. It generates a string of words by instantiating its current action using predefined templates derived from previously collected corpora with real users. Random lexical errors are added to simulate a spoken language understanding performance. Experiments on such a system have yielded a word error rate of 15% and a semantic error rate of 11% based on previous experience.

In one embodiment, the comparator 104 uses evaluation measures covering three basic aspects of task-oriented dialog systems: understanding ability, efficiency, and the appropriateness of the system actions.

The understanding ability measure analyzes the aspect of human-human dialog being a process to reach mutual understandings between the dialog partners by exchanging information through the dialog. This information exchanging process also takes place in the interaction between users and spoken dialog systems. In a task-oriented conversation, the dialog system's major task is to understand the users' needs in order to provide the right service. In the information-state update framework, the system continuously updates its information-states during the dialog while the users are conveying their requirements. If a misunderstanding occurs, there would be a mismatch between the users' requirements and the system's understandings. Thus, error recovery dialog is needed to fix the mismatches. The error recovery dialog can be initiated either by the system by asking the user to rephrase or to repeat the previous utterance, or by the user to restate the previous request.

In one embodiment, the system uses the percent of agreement between the system's and the user's understandings (understanding_agreement) to measure how well the system understands the user. The computation of this measure is illustrated through the example dialog in the table of FIG. 3. In table 300, the first column 302 shows the system utterances and the user utterances received by the system. The correct words are shown in square brackets immediately after the misunderstood words (e.g., in utterance "User1"). The second column 304 represents semantic content from the users' utterances in the form of constraint-value pairs based on the system's understandings. This information can be automatically retrieved from the system logs. The third column 306 includes the action types of the current system/user utterances. Since the dialog manager 206 is an information-updating dialog manager that manages information in the format of slots, this column also shows the number of slots that are exchanged in the utterance and the number of matched slots. In the task domain, the user can request information (req_info), request the same information again (rereq_info), answer an explicit confirmation (exp_confirm), and close a dialog (close_dialog). The system can provide information (pro_info) or explicitly confirms (exp_confirm) the information. Another available system action that is not shown in this example is to ask the user to repeat/rephrase (rephrase), where the user can respond by providing the information again (repro_info).

For the example illustrated in FIG. 3, the comparator process measures the understandings between the users and the system by comparing the values of the constraints that are specified by the users with their values understood by the system. In this dialog, the user specified all constraints (of the restaurant location domain) in the first utterance:

Service level=Five star
Cuisine type=Italian
Payment type=Credit card

As shown in table 300, the first system utterance shows that the system understood two constraints but misunderstood the cuisine type (i.e., That instead of Italian), thus the percent agreement of mutual understandings is 2/3 at this time. Then, the user restated the cuisine type and the second system utterance confirmed this information. Since the system only asks for explicit information when its confidence is low, the system's understanding on the cuisine type is counted as a 50% match with the user's. Therefore, the total percent agreement is 2.5/3. The user then confirmed that the system had correctly understood all constraints. The system then provided the restaurant information in the last utterance. At this point, the system's understanding fully matches (100%) the user's understanding.

The percent agreement of system/user understandings over the entire dialog is calculated by averaging the percent agreement after each turn of the dialog, where each turn is an input-response cycle. In this example, understanding_agreement is (2/3+2.5/3+1)/3=83.3%. It is expected that the higher the understanding_agreement measure is, the better the system performs, and thus the greater amount of user satisfaction achieved. The matches of understandings can be calculated automatically from the user simulation and the system logs.

In an alternative embodiment, the system uses a corpus level semantic accuracy measure (semantic_accuracy) to capture the system's understanding ability. Semantic accuracy is often defined as the total number of correctly understood constraints divided by the total number of constraints mentioned in the entire dialog. The understanding_agreement measure of a preferred embodiment is essentially the averaged per-sentence semantic accuracy, which emphasizes the utterance level perception rather than a single corpus level average. The intuition behind the understanding_agreement measure is that it is better for the system to always understand at least something to keep a conversation going, rather than for the system to understand very well sometimes but very badly at other times. Depending upon implementation, both the semantic_accuracy and understanding_agreement measures can be used as a basis of comparison.

As mentioned previously, a semantic frame may be used to describe semantic meanings such as speech acts, actions, instead of, or in addition to semantic constraints from the user. For this case, the semantic accuracy measure may include the speech act and action from the user utterance, as well as any semantic constraints. For example, when a user says to the dialog system "Play music by Mozart", the understanding measure can include "speech act=command" and "action=play", in addition to "composer=Mozart" and "playableObject=music".

The second measure used by the comparator is efficiency. A standard efficiency measure is the number of dialog turns. However, this standard definition does not always provide a full or accurate picture of the actual efficiency in terms of an exchange of information. In one embodiment, the system takes into account the user's dialog strategy because how the user specifies a particular constraint (such as a restaurant selection) has a certain impact on the dialog pace. For example, in one embodiment, user may specify the three constraints of selecting a restaurant in three separate utterances, while another user may specify all the constraints in one utterance. In this case, the total number of dialog turns in the second situation is smaller assuming perfect understandings. In one embodiment, the process uses the ratio between the number of turns in the perfect understanding situation and the number of turns in practice to measure the system efficiency. This measure is denoted as efficiency_ratio. In general, the bigger the efficiency_ratio value, the closer the actual number of turns is to the perfect understanding situation. In the example of Table 300 in FIG. 3, because the user chose to specify all the constraints in one utterance, the dialog length would be two turns in perfect understanding situation (excluding the last user turn which is always "I'm done"). However, the actual dialog length shown in the example dialog is six turns. In this case, the efficiency_ratio is 2/6.

Different task scenarios have different numbers of constraints. The length of the error-free dialogs can be calculated based on the user's strategy. For example, for task scenarios that contain three constraints, when the user specifies all constraints in the first utterance, the ideal dialog will have only two turns; when the user specifies two constraints in one utterance and the other constraints in a separate utterance, the ideal dialog will have four turns; and when the user specifies all constraints one by one, the ideal dialog will have six turns. Thus, in the simulation environment, the length of the ideal dialog can be calculated from the simulated users' agenda. Then, the efficiency_ratio measure can then be calculated automatically.

The third measure utilized by the system is the action appropriateness measure. This measure aims to evaluate the appropriateness of the system actions, which may be a relatively subjective characteristic. The definition of appropriateness can vary on different tasks and different system design requirements. For example, some systems always ask users to explicitly confirm their utterances due to high security needs. In this case, an explicit confirmation after each user utterance is an appropriate system action. However, in other cases, frequent explicit confirmations may be considered as inappropriate because they may irritate the users. As another example, a system may provide only a terse single or minimal word answer. In this case, if a user expects a sentence answer, such a response could be considered rude, and thus inappropriate.

Inappropriateness can thus be defined in many different ways. In one embodiment, the only inappropriate system action for a system is to provide information based on misunderstood user requirements. In this situation, the system is not aware of its misunderstanding error, and instead of conducting an appropriate error-recovering dialog, the system provides wrong information to the user which we hypothesize will decrease the user's satisfaction.

The system uses the percentage of appropriate system actions out of the total number of system actions (percent_appropriate) to measure the appropriateness of system actions. In the example of table 300 of FIG. 3, only the first system action is inappropriate out of all three of the system actions. Thus, the percent system action appropriateness is 2/3. The system's misunderstanding and the system's action in the simulated dialog environment cannot easily be detected. Therefore, this measure is calculated automatically for the simulated dialogs. For a real user corpus, inappropriate system utterances can be explicitly defined.

For this embodiment, the definition of appropriate action can be fairly loose. This is partly due to the simplicity of the task domain and the limited possible system/user actions. An added advantage of a loose definition is that the system is not biased towards one particular dialog strategy since the goal is to find some general and easily measurable system performance factors that are correlated with the user satisfaction.

In one embodiment, the three measures of understanding_agreement, efficiency_ratio, and percent_appropriate are used to build a regression model to predict a user satisfaction score. The regression model is generated by a validation of the three measures using actual user satisfaction scores. This user satisfaction data is obtained through the use or user satisfaction surveys obtained for a test dialog corpus.

In one embodiment, the regression model to predict user satisfaction score is as follows:

User Satisfaction=6.123*percent_appropriate+
2.854*efficiency_ratio+0.864*understandin-
g_agreement−4.67

For this model, the R-square value is 0.655, which indicates that 65.5% of the user satisfaction scores can be explained by this model. This prediction model may vary depending on implementation, however, it can generally be used to estimate the users' satisfaction scores for simulated users in the early system testing stage to quickly assess the system's performance. Since the weights are tuned based on the data from this specific application, the prediction model may not directly be used for other domains.

As part of a testing regime, the evaluation measures are generally intended to evaluate the system's performance in the development stage. Therefore, the measures are configured to be able to reflect small changes made in the system and to indicate whether these changes show the right trend of increased user satisfaction in reality. The evaluation measures are thus sensitive to subtle system changes.

In a validation test, a goal and agenda driven user simulation model was tested from a final evaluation dialog corpus with the real users. For this test, the simulation model interacted with the dialog system 20 times, wherein each time the simulation model represented a different simulated user. This generated nine dialogs on all of the nine tasks each time. The simulated corpus consisted of 180 dialogs from 20 simulated users, which is of the same size as the real user corpus. The values of the evaluation measures are computed automatically at the end of each simulated dialog. The estimated user satisfaction score was computed using the above equation for each simulated user. The user satisfaction scores of the 20 simulated users were then compared with the satisfaction scores of the 20 real users. Using a two-tailed t-test at significance level p<0.05, it was found that there were no statistically significant differences between the two pools of scores. This shows that the user satisfaction estimated from the simulated dialog corpus can be used to assess the system performance.

In one embodiment, the automated testing system using the three disclosed evaluation measurement is used in the early testing stages of the dialog system development cycle to make sure that the system is functioning in the desired way. The set of evaluation measures can be extracted from the simulation logs to assess the system performance. These measures can be used to guide the development of the system towards improving user satisfaction. Such a system overcomes the present disadvantages of user simulated testing systems, namely the lack of accurate representation of realistic user behaviors, and lack of feedback on user satisfaction when replacing human users with simulated users.

The evaluation measures described herein can be applied to information-providing systems on many different domains.

Aspects of the one or more embodiments described herein may be implemented on one or more computers or computing devices executing software instructions. The computers may be networked in a client-server arrangement or similar distributed computer network.

Figure 4:
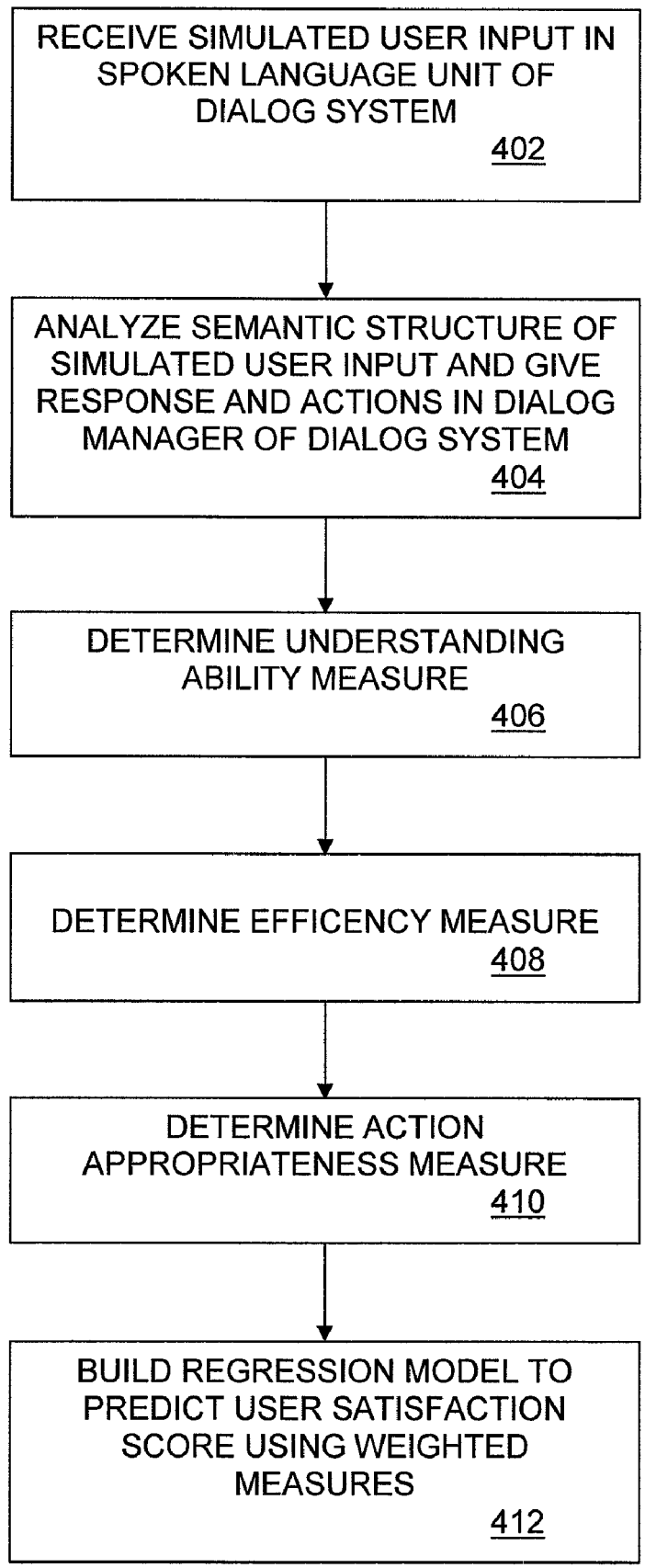
FIG. 4 illustrates a method of generating a model to predict user satisfaction of a dialog system using simulated user input, under an embodiment.

FIG. 4 illustrates a method of generating a model to predict user satisfaction of a dialog system using simulated user input, under an embodiment. The automated test process for dialog systems described herein supplements human testing with simulated users during dialog system development so to speed up the system development towards desired performance. This would be especially useful in the early development stage, since it would avoid conducting tests with human users when they may feel extremely frustrated due to the malfunction of the unstable system. The system overcomes the expense and time required to test every version of the system with real human subjects, and remedies the problem related to non-optimization of the system due to constraints imposed by limited numbers of users or repeat users.

Aspects of the automated test process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the automated test process is not intended to be exhaustive or to limit the embodiments to the precise form or instructions disclosed. While specific embodiments of, and examples for, processes in Internet search engines are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the automated test process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method of predicting user satisfaction of a dialog system, comprising:
    defining an understanding ability measure of a set of measures, corresponding to the dialog system understanding of a user input compared to the user understanding;
    defining an efficiency measure of the set of measures, corresponding to the number of dialog turns required to perform an action defined by a dialog between the user and the dialog system;
    defining an action appropriateness measure of the set of measures, corresponding to an appropriateness of one or more responses of the dialog system during each dialog turn in the dialog;
    applying the set of measures on a test dialog corpus generated between the dialog system and a group of human users;
    assigning weights to each measure of the set of measures to generate weighted measures, wherein the weight values are based on a defined regression model which is generated by a validation of the set of measures using user satisfaction scores obtained through user satisfaction surveys for the test dialog corpus;
    combining the weighted measures in a defined combinatorial equation to compute a user satisfaction score;
    building a simulated user that maintains a list of goals and agenda items to complete the goals by generating a simulated dialog corpus trained from the human-user generated test dialog corpus;
    applying the regression model to the simulated dialog corpus to generate an evaluation set of measures; and
    using the evaluation set of measures to validate the user satisfaction score.

2. The method of claim 1 wherein the weights and defined combinatorial equation based on a specific dialog application.

3. The method of claim 2 further comprising:
    receiving the user input as spoken utterances in a spoken language unit of the dialog system; and
    generating semantic representations of the user input in a dialog manager coupled to the spoken language unit.

4. The method of claim 3 wherein the semantic representations include a plurality of defined slots with a structure for different aspects of the spoken utterances.

5. The method of claim 4 wherein the set of measures comprise one or more comparisons of the semantic representations based on the dialog system understanding of the user input, and the user understanding of a dialog system response to the user input.

6. The method of claim 5 wherein the understanding ability measure compares values of constraints specified by the user and corresponding values as understood by the dialog system.

7. The method of claim 6 wherein the understanding ability measure is calculated by averaging a percent agreement after each dialog turn of the dialog.

8. The method of claim 5 wherein the efficiency measure comprises a ratio between the number of turns in a perfect understanding case and the number of actual turns for the dialog.

9. The method of claim 5 wherein the action appropriateness measure is based on a predefinition of inappropriate responses programmed into the dialog system.

10. The method of claim 5 wherein the action appropriateness measure is based on one or more responses by the dialog system to misunderstood user requirements.

* * * * *